(12) United States Patent
Swix et al.

(10) Patent No.: US 8,856,841 B2
(45) Date of Patent: *Oct. 7, 2014

(54) METHODS, SYSTEMS, AND PRODUCTS FOR CUSTOMIZING CONTENT-ACCESS LISTS

(75) Inventors: Scott R. Swix, Columbus, OH (US); William R. Matz, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 990 days.

This patent is subject to a terminal disclaimer.

(21) Appl. No.: 12/692,040

(22) Filed: Jan. 22, 2010

(65) Prior Publication Data

US 2010/0122275 A1   May 13, 2010

Related U.S. Application Data

(63) Continuation of application No. 11/241,681, filed on Sep. 30, 2005, now abandoned, which is a continuation (Continued)

(51) Int. Cl.
*H04N 7/18* (2006.01)
*H04N 21/658* (2011.01)

(Continued)

(52) U.S. Cl.
CPC ....... *H04N 7/17318* (2013.01); *H04N 21/6582* (2013.01); *H04H 60/66* (2013.01); *G06Q 30/02* (2013.01); *H04N 21/64723* (2013.01); *H04N 21/25883* (2013.01); *H04N 21/47202* (2013.01); *H04N 21/44222* (2013.01); *H04N 21/4826* (2013.01); *H04N 21/812* (2013.01); *H04N 21/4667* (2013.01); *H04H 60/64* (2013.01); *H04H 60/72* (2013.01); *H04N 21/25891* (2013.01); *H04N 21/26258* (2013.01); *H04H 20/38* (2013.01); *H04N 7/17309* (2013.01); *H04H 60/46* (2013.01); *H04H 60/65* (2013.01); *H04H 60/31* (2013.01)
USPC ............... 725/81; 725/14; 725/37; 725/39; 725/46; 725/47; 725/86; 725/105

(58) Field of Classification Search
USPC ................................ 725/14, 46, 39
See application file for complete search history.

(56) References Cited

U.S. PATENT DOCUMENTS 4,885,632 A   12/1989   Mabey et al.
5,481,294 A   1/1996   Thomas et al.

(Continued)

FOREIGN PATENT DOCUMENTS

WO     WO 96-07270     3/1996

OTHER PUBLICATIONS

U.S. Appl. No. 08/779,306, Grauch.

(Continued)

*Primary Examiner* — Kunal Langhnoja
(74) *Attorney, Agent, or Firm* — Scott P. Zimmerman, PLLC

(57) ABSTRACT

Systems, methods, and computer program products describe customizing the presentation of a content-access list. A preference for a subscriber is received, and a content database is searched for content related to the preference and for content unrelated to the preference. An option list is received including an option, and a non-preference-related option is also received. The non-preference-related option is added to the option list, and the option list is sent to the subscriber.

24 Claims, 4 Drawing Sheets

Related U.S. Application Data of application No. 10/036,923, filed on Dec. 21, 2001, now Pat. No. 7,020,652, and a continuation-in-part of application No. 11/154,248, filed on Jun. 16, 2005, which is a continuation of application No. 09/496,825, filed on Feb. 1, 200, now Pat. No. 6,983,478, which is a continuation of application No. 08/779,306, filed on Jan. 6, 1997, now abandoned.

(51) Int. Cl.

| | | |
|---|---|---|
| *H04H 60/66* | (2008.01) | |
| *G06Q 30/02* | (2012.01) | |
| *H04N 21/647* | (2011.01) | |
| *H04N 21/258* | (2011.01) | |
| *H04N 7/173* | (2011.01) | |
| *H04N 21/472* | (2011.01) | |
| *H04N 21/442* | (2011.01) | |
| *H04N 21/482* | (2011.01) | |
| *H04N 21/81* | (2011.01) | |
| *H04N 21/466* | (2011.01) | |
| *H04H 60/64* | (2008.01) | |
| *H04N 21/262* | (2011.01) | |
| *H04H 20/38* | (2008.01) | |
| *H04H 60/65* | (2008.01) | |
| *H04H 60/31* | (2008.01) | |
| *H04H 60/72* | (2008.01) | |
| *H04H 60/46* | (2008.01) | |

(56) References Cited

U.S. PATENT DOCUMENTS

| | | | |
|---|---|---|---|
| 5,537,143 A | | 7/1996 | Steingold et al. |
| 5,579,124 A | | 11/1996 | Aijala et al. |
| 5,589,892 A | * | 12/1996 | Knee et al. .................. 725/43 |
| 5,600,364 A | | 2/1997 | Hendricks |
| 5,619,247 A | | 4/1997 | Russo |
| 5,659,350 A | | 8/1997 | Hendricks |
| 5,752,159 A | | 5/1998 | Faust et al. |
| 5,774,170 A | | 6/1998 | Hitel et al. |
| 5,850,249 A | | 12/1998 | Massetti et al. |
| 5,872,588 A | | 2/1999 | Aras et al. |
| 6,081,840 A | | 6/2000 | Zhao |
| 6,177,931 B1 | | 1/2001 | Alexander et al. |
| 6,647,548 B1 | | 11/2003 | Lu et al. |
| 6,675,383 B1 | | 1/2004 | Wheeler et al. |
| 6,718,551 B1 | | 4/2004 | Swix |
| 6,757,691 B1 | | 6/2004 | Welsh |
| 6,766,524 B1 | | 7/2004 | Matheny et al. |
| 6,983,478 B1 | | 1/2006 | Grauch |
| 7,020,652 B2 | | 3/2006 | Matz |
| 7,086,075 B2 | | 8/2006 | Swix |
| 7,100,183 B2 | * | 8/2006 | Kunkel et al. .................. 725/34 |
| 7,212,979 B1 | | 5/2007 | Matz |
| 7,269,835 B2 | | 9/2007 | Swix |
| 7,441,260 B1 | * | 10/2008 | Kurapati .................. 725/46 |
| 7,444,658 B1 | | 10/2008 | Matz |
| 7,587,323 B2 | | 9/2009 | Matz |
| 7,593,858 B2 | | 9/2009 | Matz |
| 7,617,508 B2 | | 11/2009 | Gray |
| 7,661,118 B2 | | 2/2010 | Matz |
| 2002/0046099 A1 | | 4/2002 | Frengut et al. |
| 2002/0049631 A1 | | 4/2002 | Williams |
| 2002/0078443 A1 | | 6/2002 | Gadkari et al. |
| 2002/0100064 A1 | | 7/2002 | Ward et al. |
| 2002/0143647 A1 | | 10/2002 | Headings |
| 2002/0169709 A1 | | 11/2002 | Kitayama |
| 2002/0199197 A1 | | 12/2002 | Winter |
| 2003/0028432 A1 | | 2/2003 | Troyansky et al. |
| 2003/0028873 A1 | | 2/2003 | Lemmons |
| 2003/0149975 A1 | | 8/2003 | Eldering et al. |
| 2004/0133467 A1 | | 7/2004 | Siler |
| 2004/0163101 A1 | | 8/2004 | Swix |
| 2004/0193483 A1 | | 9/2004 | Wolan |
| 2004/0194131 A1 | | 9/2004 | Ellis et al. |
| 2005/0071863 A1 | | 3/2005 | Matz |
| 2005/0132419 A1 | | 6/2005 | Gray |
| 2005/0137958 A1 | | 6/2005 | Huber et al. |
| 2005/0235318 A1 | | 10/2005 | Grauch |
| 2005/0251820 A1 | | 11/2005 | Stefanik |
| 2005/0283401 A1 | | 12/2005 | Swix |
| 2005/0283792 A1 | | 12/2005 | Swix |
| 2006/0031882 A1 | | 2/2006 | Swix |
| 2006/0075456 A1 | | 4/2006 | Gray |
| 2006/0253884 A1 | | 11/2006 | Gray |
| 2006/0271438 A1 | | 11/2006 | Shotland et al. |
| 2006/0288367 A1 | | 12/2006 | Swix |
| 2007/0250846 A1 | | 10/2007 | Swix |
| 2007/0255622 A1 | | 11/2007 | Swix |
| 2008/0004962 A1 | | 1/2008 | Muthukrishnan et al. |
| 2008/0104634 A1 | | 5/2008 | Gajdos et al. |
| 2008/0147497 A1 | | 6/2008 | Tischer |
| 2008/0148311 A1 | | 6/2008 | Tischer |
| 2008/0263586 A1 | | 10/2008 | Thomas |

OTHER PUBLICATIONS

U.S. Appl. No. 10/071,742, Matz.
U.S. Appl. No. 12/508,653, Matz.
U.S. Appl. No. 10/017,111, Matz.
U.S. Appl. No. 10/039,062, Matz.
U.S. Appl. No. 10/020,779, Swix.
U.S. Appl. No. 12/567,828, Gray.
U.S. Appl. No. 12/642,905, Matz et al.

* cited by examiner

METHODS, SYSTEMS, AND PRODUCTS FOR CUSTOMIZING CONTENT-ACCESS LISTS

CROSS-REFERENCE TO RELATED APPLICATIONS

This application is a continuation of U.S. application Ser. No. 11/241,681, filed Sep. 30, 2005 (now abandoned), which is a continuation of U.S. application Ser. No. 10/036,923, filed Dec. 21, 2001, and now issued as U.S. Pat. No. 7,020,652. U.S. application Ser. No. 11/241,681 was also filed as a continuation-in-part of U.S. patent application Ser. No. 11/154,248, filed Jun. 16, 2005, which is a continuation of U.S. patent application Ser. No. 09/496,825, filed Feb. 1, 2000, and now issued as U.S. Pat. No. 6,983,478, which is a continuation of U.S. patent application Ser. No. 08/779,306, filed Jan. 6, 1997 (now abandoned), with each application incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to the utilization of content-access patterns and, more particularly, to customization of content access systems and methods based on content-access patterns and associated behaviors.

Individuals receive information and entertainment content from a wide variety of media sources. These sources include radio, newspapers, the Internet, and television content providers. To support the creation and distribution of content, providers must derive revenue from the content. Content providers derive substantial revenues from subscription and advertising. During the broadcast of a television program, advertisements, in the form of commercials, are inserted at various time intervals. An advertiser pays the broadcaster to include an advertisement with specific content or types of content.

The amount of money that an advertiser pays is directly related to the number of subscribers watching or accessing a broadcast. Conventionally, for television advertising, advertising revenue equals a rate per thousand viewers multiplied by the number of viewers estimated to be viewing a program. Similarly, web site content providers conventionally charge advertisers a fixed amount per thousand advertising impressions. Therefore, the higher the number of viewers or subscribers accessing content, the greater the revenue provider derives. And the greater the number of subscribers, the more likely it is that a greater number of the subscribers will view a particular advertisement. Therefore, content providers desire to increase the number of subscribers they serve.

Many variables affect the number of subscribers who subscribe to a content provider's service. For example, if a cable television provider is able to offer channels that other competitive providers in the viewing area do not offer, the provider is likely to draw subscribers away from the competitors. Also, if a provider's services are easier to use or include more features or more useful features than the competition, the provider may be able to draw competitors' subscribers. Therefore, providers strive to provide a plurality of services that are attractive to subscribers, especially when compared to the services of the provider's competitors.

One such service is an electronic program guide (EPG) or other similar menu system for accessing content. Conventional EPGs for advanced television systems provide access to new content types and services, such as pay per view (generally, in a digital television application referred to as video on demand (VOD) or near video on demand (NVOD)), movies, games, news reports, as well as product purchases for books and other items.

The EPG is, generally speaking, an electronic multi-level menu, which first presents a list of broad categories from which a subscriber can select. As the subscriber selects from among these broad categories, the EPG presents more discrete categories. The EPG may present categories in various ways using various methods. For example, providers conventionally sort the category lists alphabetically or based on the general popularity of specific categories. Under these approaches, all subscribers receive the same menu in the same order, regardless of their personal preferences.

The lack of customization has been due in part to a lack of technology for accurately tracking a subscriber's preferences. Although methods exist for tracking the historic preferences of small numbers of subscribers, no efficient method exists for accurately tracking a large number of subscribers in real near real time. The lack of customization also stems from the expense and difficulty of customizing individual subscriber's EPGs.

Several conventional approaches allow a subscriber to customize a menu or EPG. The conventional approaches are primarily manual processes on the part of the user to set up an automated or semi-automated update process. A set-top box or other menu presentation device then implements the update of the EPG based on the user settings.

For example, the patent to Peter D. Halenbeck, U.S. Pat. No. 5,038,211, discloses a method and apparatus for displaying only menu options meeting selection criteria set by user. The patent to Theodore S. Rzeszewski, U.S. Pat. No. 5,917,481 discloses a set-top box, which includes a feature to add "select" channels, wherein the user manually configures a plurality of channels, and only those channels appear in the EPG.

A similar approach is used by a TiVo® system, which allows a user to select a category, actors, and other preferences for recording television programming. TiVo can also perform a predictive interest algorithm to record programs you might wish to view based on previous viewing. (TiVo® is a registered trademark of TiVo Inc., Alviso, Calif.). As with other conventional methods, TiVo® requires manual configuration by a user before recording can take place.

Conventional approaches for displaying option lists are simplistic and generic, and fail to attract subscriber and do not allow providers to differentiate themselves from one another. Also, because of the shear volume of content available in any given media, conventional systems and methods generate options lists that are difficult for a subscriber to navigate efficiently. Also, conventional systems and methods require the user to make conscious, deliberate decisions and selections in order to find the product offerings or content that meets their desired interests. Because the conventional process requires that a series of manual steps be followed for any level of customization, the process is more complex than is necessary.

In addition, it is slow and inefficient to update the content availability in current content option lists, and therefore, it is difficult to present a customized list even after the subscriber has performed manual configuration. Conventional systems and methods also fail to take advantage of known content viewing patterns and related behaviors in order to provide alternative or additional product offering lists that may be pre-sorted based on the viewing patterns.

SUMMARY

The exemplary embodiments provide systems and methods for customizing the presentation of a content-access list based on subscriber-specific information, such as historic viewing preferences and related information. The exemplary embodiments include a content-access-history database, a content database, and an option list creator, which combines data in the content-access-history and content databases to create lists of content-access options that are customized for individual subscribers.

According to the exemplary embodiments, the content-access-history database includes information about actions the subscriber has taken to access content, such as television programming or information on web sites. The content-access-history database may be a clickstream database. The content-access-history database may include a category attribute. In an embodiment, the content-access-history includes television-viewing-history database. For example, the content-access-history database may indicate that at 8:00 p.m. on January 1, the subscriber's television was tuned to channel 12.

The content database describes content available from various content providers via various mediums. Exemplary embodiments, for example, include a television programming history database. The content and content-access-history database are combined to provide a complete history of the content accessed by a subscriber. In the example above, if the provider of content on channel 12 broadcasts or otherwise provides a basketball game at 8:00 p.m. on January 1, then it can be determined that the subscriber was watching a basketball game on that date and at that time. The content-access-history and content databases include various key data fields to link the data, including, for example, the data and time and medium (e.g., channel number).

The combined data forms a content preference profile (CPP) for a subscriber and is useful for a variety of applications. In exemplary embodiments, an option list creator software application utilizes the CPP to create options lists, which are customized to a subscriber's viewing preferences. The option list creator may be an application executing on a set-top box in a subscriber's home or may be an application executing on a processor in a content provider facility, such as a cable television operator's head-end facility.

The option list provides a means for a subscriber to access further option lists or to access content. For example, in exemplary embodiments, the option list creator creates a menu, such as an electronic program guide. Content available via a specific option varies depending on the medium that the subscriber is using to access the content. For example, if the subscriber is using an EPG presented by a set-top box connected to a television, then the content may comprise at least one of a cable television station, a video-on-demand server, and a personal video recorder.

In exemplary embodiments, the option list creator customizes the option list for a subscriber. For example, the options displayed by an EPG are conventionally sorted alphabetically. By utilizing the subscriber's content preference profile, the EPG creator application sorts the options so that the options that are most likely to appeal to the subscriber appear at the top of the list.

The exemplary embodiments provide numerous advantages when compared to conventional methods for providing customized options lists. By providing a simpler, more accurate option list, a content provider is likely to attract additional subscribers. Also, various content providers operating in the same medium, such as cable operators and satellite television providers, strive to differentiate their offerings to attract subscribers. The exemplary embodiments offer these providers a mechanism for differentiation.

Moreover, as the deployment of digital television inexorably increases content choices to hundreds or thousands of individually available content selections, such pre-filtering or sorting becomes important in order for the viewer to have the ability to easily and efficiently manage the volume of choices available. By sorting the content option lists so that access to preferred content appears first, exemplary embodiments simplify the process of accessing content for the subscriber. The subscriber is spared from having to wade through less desirable or undesirable content. Therefore, the likelihood that the viewer will find the content he is interested in is increased along with the subscriber's overall satisfaction.

Customization of the option list is also much simpler than for conventional systems. Conventional systems require that the subscriber manually configure a set-top box or provide viewing preferences before an EPG will filter or sort content option lists for a subscriber. In exemplary embodiments the content preferences are compiled automatically and then applied to the creation process for the option list, simplifying the process for the subscriber while, at the same time, providing a more accurate representation of the subscriber's current content preferences.

Further details and advantages are set forth below.

BRIEF DESCRIPTION OF THE FIGURES

These and other features, aspects, and advantages are better understood when the following Detailed Description is read with reference to the accompanying drawings, wherein.

DETAILED DESCRIPTION

Exemplary embodiments provide systems and methods for creating a customized content option list using preferences derived from a content-access-history database. Some exemplary embodiments include a video-on-demand menu item generator linked to a subscriber content preference profile evaluator. The evaluator retrieves preferences from the preference profile and uses the preferences to filter or sort the menu items generated by the menu item generator. A menu presenter presents the filtered or sorted menu items as an option list to the subscriber.

Figure 1:
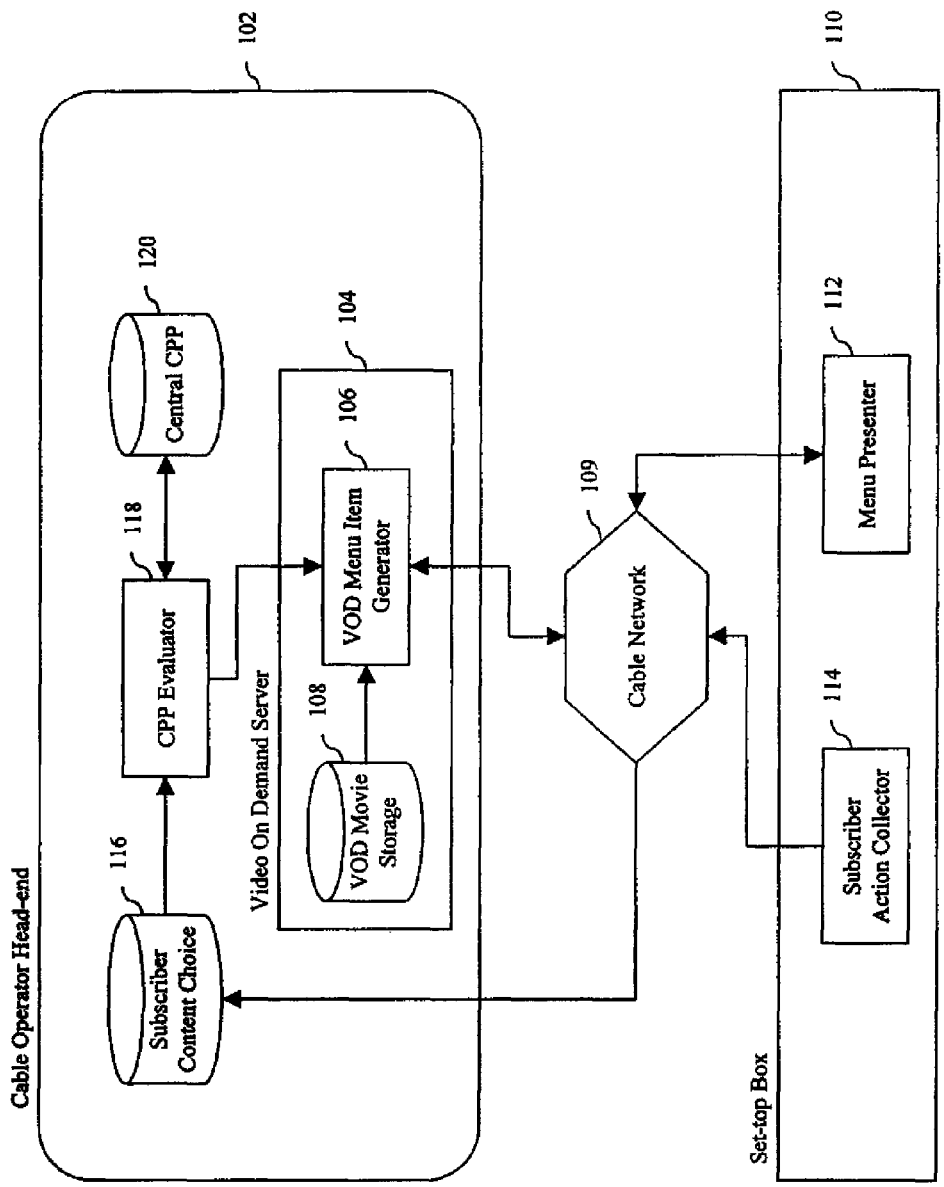
FIG. 1 is a block diagram of an exemplary embodiment and an exemplary environment for centralized operation.

FIG. 1 is a block diagram illustrating centralized storage and evaluation of the content preference profile, according to exemplary embodiments. A cable operator head-end facility 102 includes a video-on-demand (VOD) server 104. The VOD server 104 includes a menu item generator 106 linked to a movie storage database 108. The menu item generator 106 is operative to generate a menu or list of options from which a subscriber can select various content, such as video-on-demand. The menu item generator 106 also receives and responds to commands related to menu presentation. The movie storage database 108 provides content, which can be delivered to a subscriber. In other embodiments, the cable operator head-end includes various other sources of content, including television-programming servers, local advertising servers, e-commerce merchandising servers, and a satellite signal receiver. In the embodiment shown in FIG. 1, the VOD server 104 is linked to a cable network 109, which is in turn linked to a set-top box 110 in a subscriber's home (not shown).

The set-top box 110 includes various software applications, including a menu presenter 112 and a subscriber action collector 114. The menu presenter 112 receives information from the menu item generator 109 via the cable network 109, and presents a menu on a video display device (not shown), such as a television or personal computer. The menu presenter also receives commands and forwards them to the menu item generator 106 as necessary. In some exemplary embodiments the menu presenter 112 provides an electronic program guide (EPG) that includes the generated option list. In other exemplary embodiments the menu presenter 112 provides a multi-level menu, wherein selecting an option from the option list results in the display of another option list. In yet another embodiment, the menu provider presents a simple display of the option list within a picture-in-a-picture (PIP) window on the television display. The option list provides access to various types of content, such as cable television stations, video-on-demand or near video-on-demand, and output from personal video recorders.

The subscriber action collector 114 records actions taken by the subscriber when viewing a program. The subscriber action collector 114 may include a clickstream database. A clickstream database is common in Internet monitoring applications and similar databases have been described for tracking television subscriber actions, as described in a patent application by Meadows et al., U.S. application Ser. No. 09/496,825, filed Feb. 1, 2000, which is incorporated herein by reference. The clickstream database tracks individual subscriber actions, such as clicking a hyperlink on a web page or pushing a button on a television remote control.

The subscriber action collector 114 transmits subscriber actions via the cable network 109 to a subscriber content choice database 116. The subscriber actions are combined in the content choice database 116 with local and national programming and advertising data. The resultant data details the programming and advertising displayed on the subscriber's video display and, over a period of time, provides a content-access-choice history for each subscriber. The exemplary embodiments may be advantageously implemented with the systems and methods disclosed in a patent application filed by Matz et al. on Dec. 14, 2001, entitled, "System and Method for Utilizing Television Viewing Patterns" Ser. No. 10/017,742, which is incorporated herein by reference.

The content choice database 116 may include a category attribute. The category attribute provides data that the CPP evaluator 118 can use to more accurately generate a profile for a subscriber. For example, in some exemplary embodiments, the subscriber content choice database 116 includes a television viewing history. The viewing history includes a genre attribute, which can be used to categorize each show. The genre attribute may include, for example, "Sports," "Science Fiction," and "Drama."

Once subscriber choices have been stored in the subscriber content choice database 116, a content preference profile (CPP) evaluator 118 analyzes data for each subscriber to generate an individual CPP and store the CPP in the central CPP database 120.

In some exemplary embodiments the CPP database 120 includes additional information, such as the subscriber's purchase history and demographic measures describing the purchaser. Exemplary embodiments may be advantageously implemented with the systems and methods disclosed in a patent application filed by Matz et al. on Dec. 14, 2001, entitled, "System and Method for Developing Tailored Content" Ser. No. 10/017,630, which is incorporated herein by reference. For example, in some exemplary embodiments, the CPP database 120 includes a credit card purchase history. The purchase history may include purchases of the content provider's products and/or services and may include purchases of products and/or services, which are complementary to or competitive with the content provider's products and/or services. In other exemplary embodiments the CPP database 120 includes a property-ownership database. In yet more exemplary embodiments, the CPP database 120 includes a survey result or questionnaire response database. The subscriber demographics, purchase history, or other additional information may be used in conjunction with the content-access-history to generate a customized content-access list.

Figure 2:
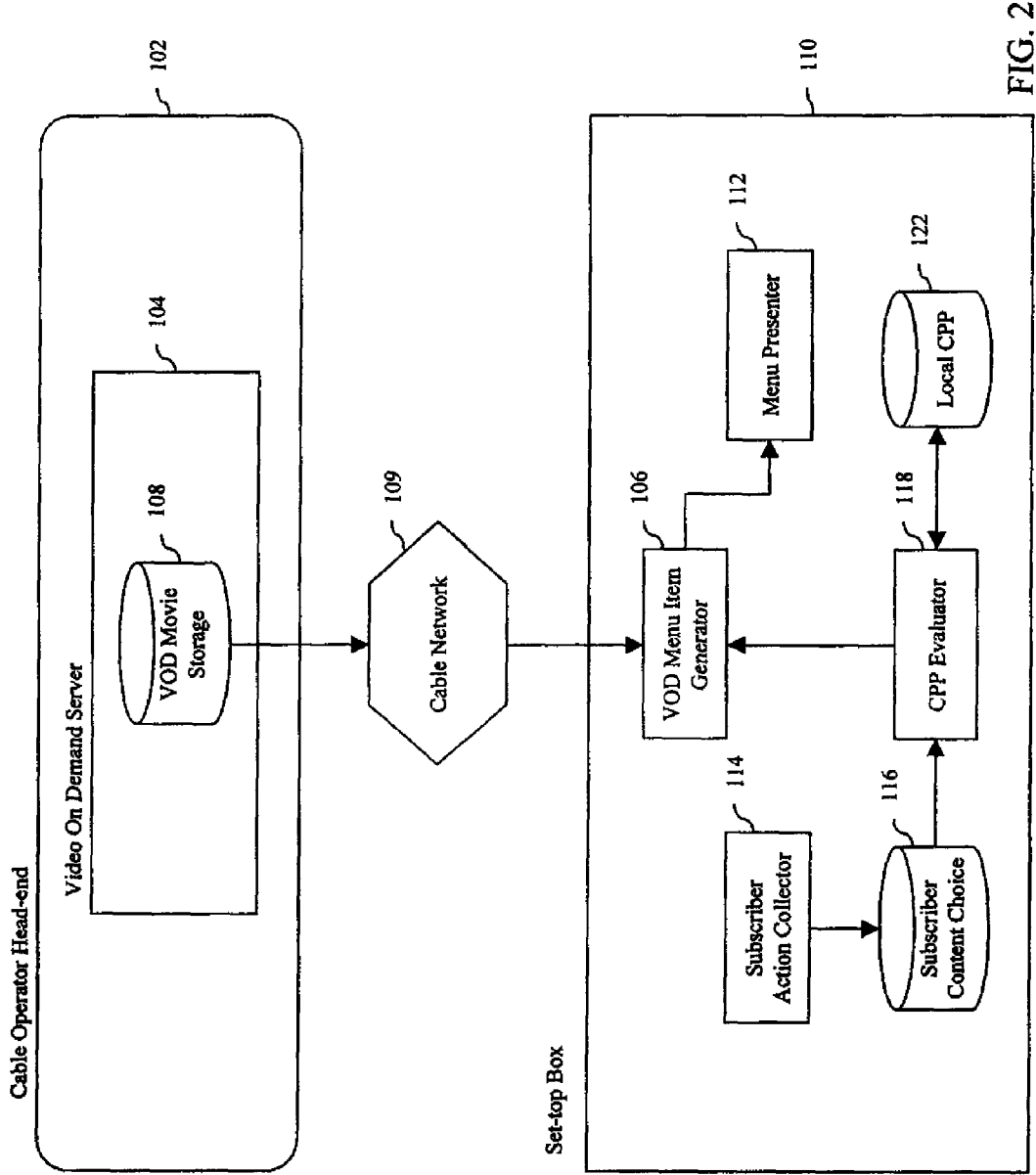
FIG. 2 is a block diagram of an exemplary embodiment and an exemplary environment for decentralized operation.

The central CPP database 120 includes profiles for a plurality of subscriber accessing the cable operator head-end 102. To ensure a high level of privacy and security, an individual subscriber may desire that her content choices and general profile be stored locally and not be transmitted to a central facility, such as the cable operator head-end shown in FIG. 1. FIG. 2 is a block diagram illustrating a decentralized or distributed system, where the cable operator head-end 102 includes only the VOD server 104 and movie storage database 108. The VOD menu item generator 106, subscriber content choice database 116, CPP evaluator 118 and local CPP profile database 122 execute within the set-top box. Although FIG. 2 illustrates these application components executing on the set-top box 110, the components may also execute on various other types of equipment and may also execute on separate pieces of equipment. For example, in one embodiment, the components are included in a video display system. In another embodiment, the video display system includes the subscriber action collector 116, but all menu creation and content delivery components execute on the set-top box 110.

In other exemplary embodiments, to help to ensure the privacy of the subscriber, personally identifying information is omitted. The subscriber is assigned a unique identifier, which is stored in the various databases in lieu of the identifying information.

Although the exemplary embodiments above refer to a cable television service provider, any content provider, including, for example, broadcast companies, satellite television providers, and Internet media providers may successfully implement the exemplary embodiments. Content available in various embodiments may include both video and audio content, multimedia games, news sources, Internet sites, such as e-commerce sites, and any other content type of interest to a subscriber.

In conventional EPGs and other menu systems, content is arranged using general rules of organization. For example, in some conventional guides, the options, including content types and content titles, appear alphabetically. In other guides, the options appear based on the popularity of the option with a general population. The exemplary embodiments, however, may present the options in an order based on the subscriber's preferences, which are derived from the subscriber's content-access history and other subscriber-specific information.

Figure 3:
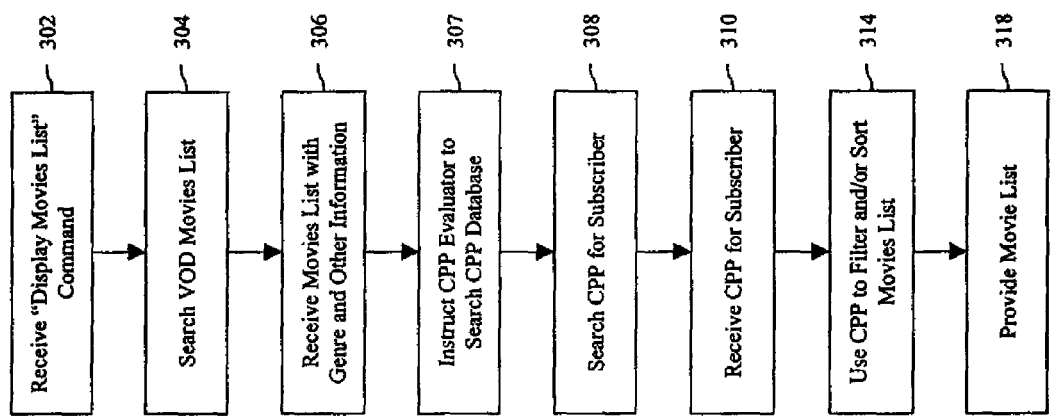
FIG. 3 is a flowchart illustrating a process implemented by a video on demand menu item generator, according to exemplary embodiments.

FIG. 3 is a flowchart, illustrating such a process as performed by the VOD menu item generator (106) and CPP evaluator (118) shown in FIG. 1, according to exemplary embodiments. The process begins when the menu item generator (106) receives a "Display Movies List" command 302. The command may be generated as a result of a subscriber action or as an automated response to a pre-defined event, such as when the set-top box (110) is turned on. In response to the command, the menu item generator (106) searches the VOD movie storage database (108) for movies 304. The database (108) executes a query and returns the movie list, including the movie genre and other information, to the VOD menu item creator (106). The menu item creator (106) next instructs the CPP evaluator (118) to search the CPP database (120 or 122) for the CPP corresponding to the specific subscriber requesting the movie list 307.

The CPP evaluator (118) searches the CPP database (120 or 122) 308. In response, the database (120 or 122) returns the CPP for the subscriber, to the CPP evaluator (118) 310. The CPP evaluator (118) provides the profile to the menu item generator (106), which uses the CPP to filter or sort the movie list 312. If menu item generator (106) filters the data, only items corresponding to the subscriber's preferences are displayed. If the menu item generator (106) sorts, but does not filter, the data, preferred items appear at the beginning of the list, and non-preferred items appear at the end.

For example, if, according to the CPP, the subscriber watches only sports and science fiction programs, then the menu item generator (106) generates a list including only sports and science fiction programming. In other exemplary embodiments, the menu item generator (106) generates a list including all movie types. The sports and science fiction programs appear at the top, and non-relevant categories or options are presented at the bottom. The menu item generator (106) provides the final list to the menu presenter (112) via the cable network (109) 314.

The subscriber content choice database 116 includes the content-access-history of one or more subscribers. The database 116 may include a preference rating, denoting the importance of a particular preference to the subscriber. The CPP evaluator (118) calculates the preference rating by analyzing historical subscriber actions. For example, over a period of several months, a subscriber may demonstrate a preference for live sports. If the subscriber also demonstrates a preference for sports reruns, then the relative weight of sports as a preference would rank above the preference for live television. The exemplary embodiments use the preference rating to further sort the option list.

The subscriber merely watches the television or other video display and makes selections from the electronic program guide (EPG). As he makes choices, these choices are recorded and used to create the CPP. The subscriber, in some exemplary embodiments, turns the filtering or sorting of the EPG on and off as desired. In other exemplary embodiments, the subscriber fills out a form, electronic or paper, detailing her preferences. This form is used to initialize the CPP database (120 or 122) so that the user's preferences may be used to filter or sort the EPG even though little or no subscriber actions have been recorded. In yet other exemplary embodiments, the subscriber sets a parameter, instructing the CPP evaluator 118 to use only a specified time period within the CPP database (120 or 122). For example, a subscriber who is a sports fan may not wish her preferences for football to carry into the spring and summer. He may prefer that the preferences used during spring and summer be derived from viewing patterns occurring after January.

Figure 4:
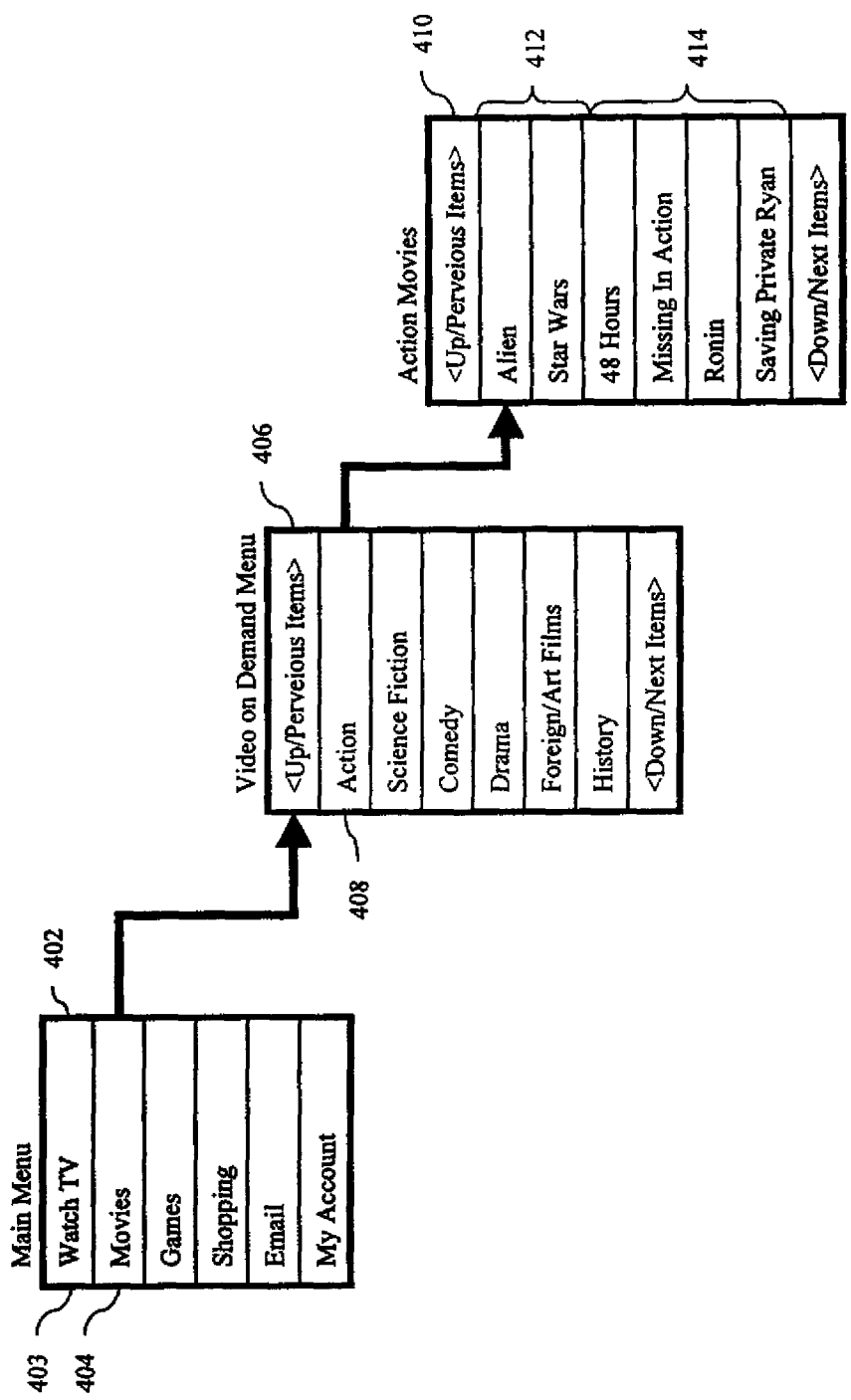
FIG. 4 illustrates a hierarchy of menus generated, according to exemplary embodiments.

FIG. 4 is an illustration of a multi-level menu, according to exemplary embodiments. The menu item generator (106) shown in FIGS. 1 and 2 creates each of the menus using the process illustrated in FIG. 3. The menu item generator (106) initially generates the Main Menu 402. The Main Menu 402 includes several options. As illustrated by the order of the options contained in Main Menu 402, the subscriber most prefers to watch television 403. The subscriber's next preference is to watch movies 404. The remaining options are sorted by a predefined sort order, such as alphabetically.

In the exemplary embodiment shown, when the subscriber selects the Movies option 404, the menu item generator (106) creates the Video on Demand Menu 406. As with the Main Menu 402, options in the Video on Demand Menu 406 appear according to the subscriber's preferences. The subscriber prefers movies in the action genre 408. When the subscriber selects the Action option 408 in the Video on Demand Menu, the menu item generator (106) creates the Action Movies option list 410. Each of the movies in the Action Movies list 410 is related to the action genre. The movies may also be related to additional genres, such as comedy and science fiction. The subscriber for whom the Action Movies list 410 was created prefers science fiction after action. Therefore, in the Action Movies list 410, the action movies that are also science fiction movies are displayed first 412. All other action movies are displayed below in alphabetical order 414.

Exemplary embodiments provide great value to content providers and assist the provider in attracting subscribers. The content providers may be billed a flat subscription-type rate for provision of the service, or they may purchase the hardware and/or software required for implementing the exemplary embodiments within their facility or in the homes of their subscribers.

Other exemplary embodiments include a computer-readable medium, having computer-readable instructions for providing a content option list, including program code for combining data in a subscriber content-access-history database with data from a content database and using the combined data to construct a customized option list. The computer-readable medium may also include program code for sorting the option list, delivering the option list to a television set-top box or other menu presentation device, and displaying the option list.

A computer-readable medium includes an electronic, optical, magnetic, or other storage or transmission device capable of providing a processor, such as the processor in a web server, with computer-readable instructions. Examples of such transitory and non-transitory mediums include, but are not limited to, a floppy disk, CD-ROM, magnetic disk, memory chip, or any other medium from which a computer processor can read. Also, various other forms of computer-readable media may transmit or carry instructions to a computer, including a router, private or public network, or other transmission device or channel.

The exemplary embodiments have been presented only for the purpose of illustration and description and are not intended to be exhaustive or limiting. Numerous modifications and adaptations thereof will be apparent to those skilled in the art without departing from the spirit and scope of the exemplary embodiments.

The invention claimed is:
1. A method, comprising:
receiving at a processor a preference for a subscriber from a content-access-history database;

searching a content database for content related to the preference;

searching the content database for content unrelated to the preference;

receiving at the processor an option list from the content database, wherein the option list comprises an option;

receiving a non-preference-related option from the content database;

adding the non-preference-related option to the option list; and sending the option list to the subscriber.

2. The method according to claim 1, further comprising wirelessly accessing the option list.

3. The method according to claim 1, further comprising generating a list of movies.

4. The method according to claim 3, further comprising sorting the list of movies according to the preference.

5. The method according to claim 1, wherein receiving the non-preference-related option comprises receiving purchase information.

6. The method according to claim 1, wherein receiving the non-preference-related option comprises receiving a history.

7. The method according to claim 1, wherein receiving the non-preference-related option comprises receiving credit card purchase information.

8. The method according to claim 1, wherein receiving the non-preference-related option comprises receiving demographic information.

9. The method according to claim 1, wherein receiving the non-preference-related option comprises receiving a questionnaire.

10. The method according to claim 1, further comprising receiving a profile of the subscriber.

11. The method according to claim 1, further comprising sorting the option list by genre.

12. A system, comprising:
a processor executing code that causes the processor to:
receive a preference for a subscriber from a content-access-history database;
search a content database for content related to the preference;
search the content database for content unrelated to the preference;
receive an option list from the content database, wherein the option list comprises an option;
receive a non-preference-related option from the content database;
add the non-preference-related option to the option list; and
send the option list to the subscriber.

13. The system according to claim 12, further comprising code for wirelessly accessing the option list.

14. The system according to claim 12, further comprising code for generating a list of movies.

15. The system according to claim 14, further comprising code for sorting the list of movies according to the preference.

16. The system according to claim 12, further comprising code for receiving purchase information.

17. The system according to claim 12, further comprising code for receiving a history.

18. The system according to claim 12, further comprising code for receiving credit card purchase information.

19. The system according to claim 12, further comprising code for receiving demographic information.

20. The system according to claim 12, further comprising code for receiving a profile of the subscriber.

21. The system according to claim 12, wherein the preference is genre.

22. A non-transitory computer readable medium storing instructions for performing a method, the method comprising:
receiving a preference for a subscriber from a content-access-history database;
searching a content database for content related to the preference;
searching the content database for content unrelated to the preference;
receiving an option list from the content database, wherein the option list comprises an option;
receiving a non-preference-related option from the content database;
adding the non-preference-related option to the option list; and
sending the option list to the subscriber.

23. A method, comprising:
receiving a preference for a subscriber at a processor;
searching a content database for content related to the preference;
searching the content database for content unrelated to the preference;
receiving at the processor an option list associated with the preference;
receiving at the processor an option that is unrelated to the preference; and
adding the option to the option list.

24. A method, comprising:
receiving at a processor a genre preference for a subscriber;
searching a content database for content related to the genre preference;
searching the content database for content unrelated to the genre preference;
generating an option list by the processor that is associated with the genre preference;
receiving an option that is unrelated to the genre preference; and
generating another option list comprising the option.

* * * * *